Oct. 11, 1966  P. THOME  3,278,388
BRACES FOR FUEL ELEMENT CLUSTERS
Filed May 7, 1964  3 Sheets-Sheet 2

INVENTOR
PAUL THOME

BY Bacon & Thomas
ATTORNEYS

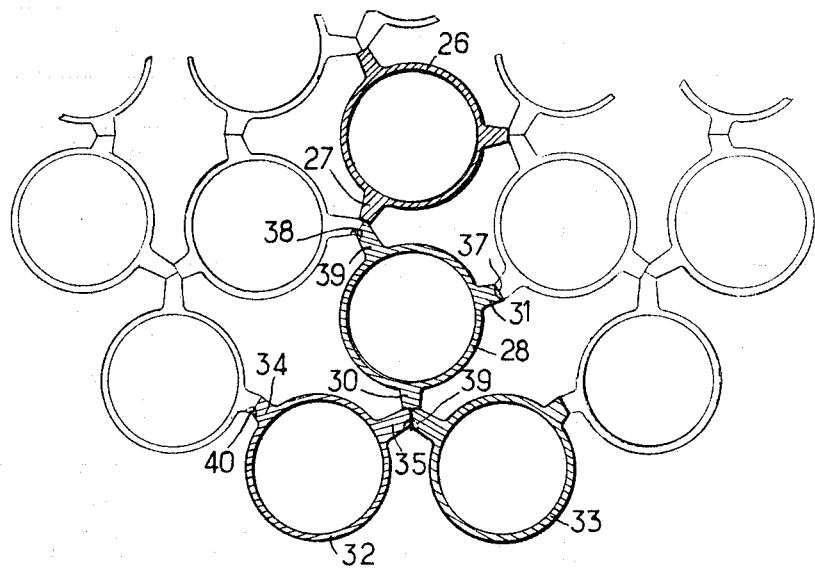
FIG.4
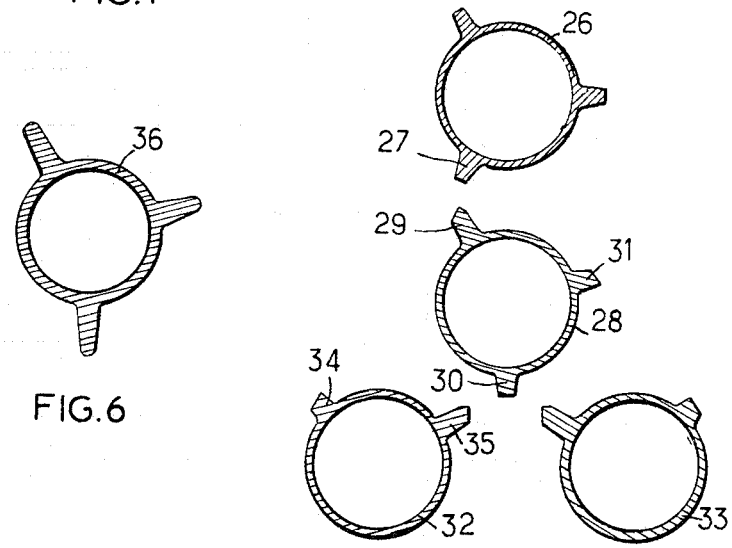
FIG.6
FIG.5
INVENTOR
PAUL THOME

United States Patent Office 3,278,388
Patented Oct. 11, 1966

3,278,388
BRACES FOR FUEL ELEMENT CLUSTERS
Paul Thome, Saint-Cloud, France, assignor to Commissariat a l'Energie Atomique, Paris (Seine), France
Filed May 7, 1964, Ser. No. 365,634
Claims priority, application France, May 22, 1963,
935,759
7 Claims. (Cl. 176—78)

The present invention relates to fuel elements for nuclear reactors which are cooled by a thermal fluid.

The invention is more especially concerned among such fuel elements with those which are formed by an assembly of clad fuel pencils which are arranged in parallel relation so as to form a cluster and held in position by means of support grids.

The invention is more particularly concerned, in fuel element clusters of this type, with the braces which are usually placed at the mid-length of the pencils in order to maintain constant the section of passageway which is provided for the thermal fluid and to increase the mechanical strength of the cluster.

As a natural consequence of the need to extract more heat from a fuel element in order to increase energy efficiency, the surface area which is exposed to the cooling action of the thermal fluid must be increased to the maximum extent. The fuel element clusters which are formed of an assembly of juxtaposed fuel pencils are an example of design which results from this requirement. If identical fuel pencils are considered, the most closely-grouped clusters constructed of concentric rings will consist of 7, 19, etc., fuel pencils.

However, in order to achieve satisfactory characteristics, a certain number of conditions must be satisfied which are liable to vary according to the nature of the cooling fluids employed, such as pressurized water, boiling water or pressurized gas. A fuel element cluster is formed of an assembly of unitary fuel rods or so-called pencils and this assembly is subjected to a certain number of mechanical stresses such as those which arise from fuel handling operations within the fuel channel, those which result from pressure drops, fluid friction, vibrations, stresses of thermal origin, and stresses which arise from the effects of radiation (fission products).

Fuel elements are evidently required to withstand these various stresses throughout the design burn-up period and to have a neutron absorption capacity which is as small as possible. From the point of view of neutron flux distribution, it is preferable to make use of unitary fuel pencils which are as long as possible with a view on the one hand to reducing as far as possible the weight of structural material which is introduced within each fuel channel in the form of end elements such as end-caps and support grids and, on the other hand, to permitting the possibility of placing the maximum quantity of fissile material within each fuel channel, all other things being equal.

However, in order to obtain advantageous characteristics, the maximum quantity of heat per unit volume of fuel must be delivered, which presupposes very high thermal gradients within the fuel element and good efficiency of the thermal fluid. This condition, which is essential for reactor economy, is attended by the following consequences:

Thermal instability of the fuel pencil: if the fuel pencil becomes bowed to a slight extent, the passage which is afforded to the coolant is reduced, the longest portion of the can is the least effectively cooled and the process accelerates both in temperature and in deformation, resulting in local melting of the can;

Substantial pressure drops: since the fluid circulates at high velocity, the pressure drops call for increased power of the blowers at the expense of reactor economy; this point rapidly becomes highly critical.

Thermal instability imposes the presence of anti-bowing braces which are located at a certain point along the fuel pencils (usually at mid-length) in order to maintain constant spacing, that is to say to maintain constant the cross-sectional area of passage which is provided for the flow of fluid between the fuel pencils. Braces also endow the cluster with greater mechanical strength. Unfortunately, they have the effect of increasing pressure losses and it is therefore important that they should be designed to reduce such losses to a minimum.

Accordingly, the present invention is intended to permit the construction of braces which afford minimum pressure drops while at the same time endowing fuel elements with maximum stability.

The primary object of the invention is make said braces such that they meet practical requirements in a more effective manner than has hitherto been possible, particularly insofar as they combine maximum stability of the fuel element with minimum pressure losses sustained by the thermal fluid.

The invention mainly consists—in a fuel element cluster consisting of more than one ring of fuel pencils which are disposed around a central rod or fuel pencil and which are spaced apart relatively to each other by means of at least one system of spacer members—in constructing said system with a certain number of spacer members which are brought to bear at the same time against three fuel pencils, and in welding together at least all the spacer members of the outer ring in such manner as to form a single-piece outer ring, but without welding the spacer members from one ring to another.

Apart from this main arrangement, the present invention additionally consists in certain other arrangements which are preferably employed at the same time and which are to be considered either separately or in any operative combination, namely the following:

Each spacer member is formed of at least one collar which may additionally be provided with fins of suitable number and shape, said fins being adapted to bear against the collar or against the fins of the spacer members of a certain number of adjacent fuel pencils;

Said spacer members are formed by machining which may if necessary be preceded by an extrusion and drawing operation;

Said spacer members are secured around the fuel-pencil cans by means of a controlled brazing operation, especially as performed in vacuo;

Said spacer members are formed of Zircalloy;

Said spacer members are formed of stainless steel;

Said spacer members are formed of alloys of the nickel-chrome type.

The invention will in any case be more clearly understood by perusal of the complementary description which now follows and by reference to the accompanying drawings, said complementary description and drawings being given solely by way of indication and not in any limiting sense.

In the accompanying drawings:

FIGS. 4 and 5 are two views in transverse cross-section of a second form of embodiment of a set of spacer members in accordance with the invention, as respectively assembled together and split up into component parts;

FIG. 6 is a view in transverse cross-section of a blank for the fabrication of a spacer member in accordance with said second form of embodiment.

Figure 1:
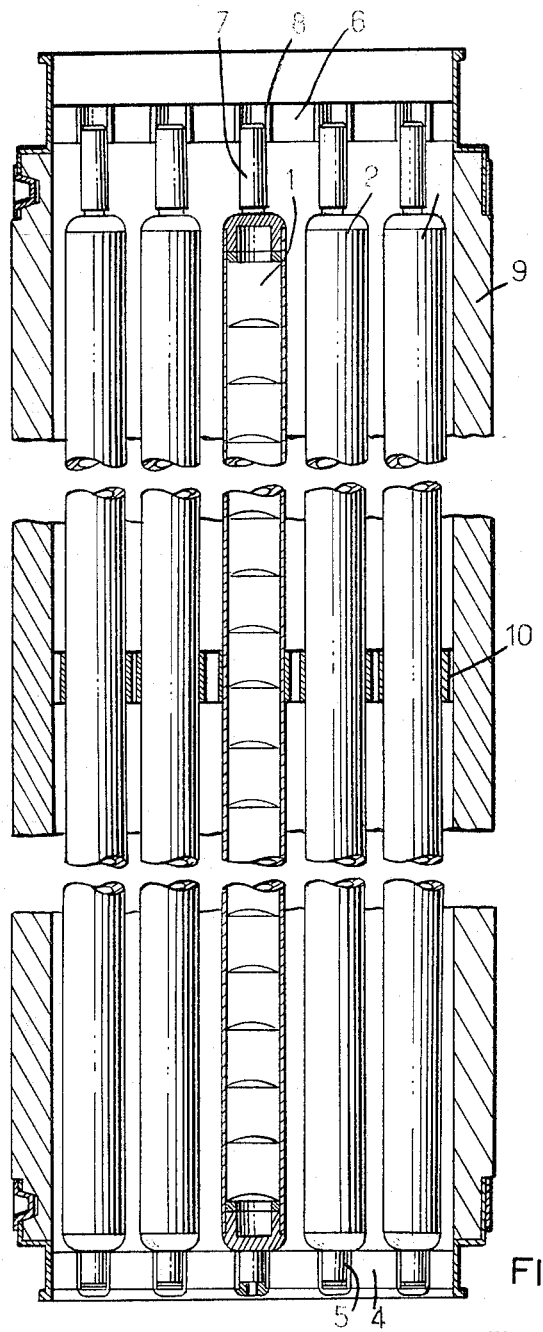
FIG. 1 is a view in axial cross-section of a fuel element in accordance with the invention.

The spacer members in accordance with the invention are intended for a fuel element cluster of the type shown in FIG. 1 which is provided around a central rod or fuel pencil 1 with more than one ring of fuel pencils such as the fuel pencils 2 and 3, that is to say more than seven fuel pencils. In fact, in this case, if it is desired to maintain the fuel pencils at a constant distance from each other and to forestall any possibility of relative displacement, a large number of supports between the fuel pencils then become necessary, thereby resulting in corresponding increases in pressure losses. The fuel pencils such as those designated by the references 1, 2 or 3 can be fitted in a bottom support grid 4 by means of nipples or studs such as the stud 5 and are capable of expanding freely within a stop support grid 6 by means of nipples or studs such as the stud 7 which are capable of sliding, for example, for a distance of a few millimeters within recesses such as the recess 8. The two support grids 4 and 6 can be joined together by means of an outer jacket 9 or alternatively by means of tie-rods which endow a fuel element cluster of this type with the requisite mechanical strength in the axial direction. In certain cases, it is possible to make use of the central fuel pencil as a tie-rod which is accordingly no longer combustible. In a fuel element cluster of this type, the fuel pencils are subjected to an unstable thermal state which has a tendency to cause a variation in the distances between centers. It is for this reason that provision is made as a rule at their mid-length for a brace consisting of a set of spacer members 10, the purpose of which is to maintain perfect spacing between the fuel pencils. It is these spacer members 10, the position and function of which have now been defined, which constitute the object of the present invention.

Figure 2:
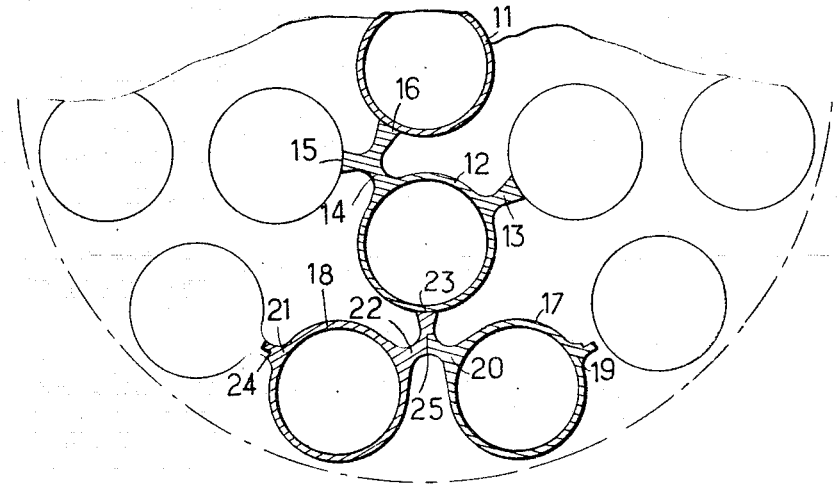
FIGS. 2 and 3 are two views in transverse cross-section of a first form of embodiment of a set of spacer members in accordance with the invention, as shown respectively assembled together and split up into component parts.
Figure 3:
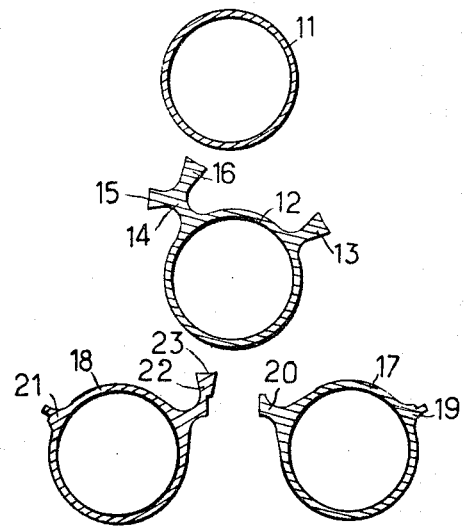

In a first form of embodiment of a set of spacer members as illustrated in FIGS. 2 and 3, the spacer member 11 which is placed around the central rod or fuel pencil consists of a simple collar.

The spacer members 12 which are placed around the fuel pencils of that ring which immediately surrounds the central rod or fuel pencil consist of a collar which is similar to the preceding but which is additionally provided with two fins 13 and 14. The fin 13 bears against the collar of an adjacent spacer member of the same ring and the fin 14 has two bearing surfaces, namely a bearing surface 15 which is brought to bear against the collar of the other adjacent spacer member of the same ring, and a bearing surface 16 which is brought to bear against the collar of the central rod or fuel pencil. All the spacer members 12 of said first ring of fuel pencils are therefrom identical.

On the contrary, the spacer members of the following ring which, in the example described, is the outer ring, are of two alternate kinds 17 and 18. There are formed on the collars of the spacer members 17 two fins 19 and 20 which are both applied against the fins of the two adjacent spacer members of the same ring; there are also formed on the collars of the spacer members 18 two fins 21 and 22 which are also applied against the fins of adjacent spacer members of the same ring, the fin 22 being additionally provided with a bearing surface 23 which is intended to bear against the collar of a spacer member of the intermediate ring.

This set of spacer members or brace which consists of four different kinds of spacer members permits the possibility of preventing any disengagement of the fuel pencils under the effect of radial stresses which could result from possible rotational motion of the said fuel pencils about their own axis.

The spacer members referred-to can be formed either of stainless steel or of Zircalloy, depending on whether the thermal fluid is carbon dioxide gas or pressurized steam. Said spacer members can be fabricated by machining and brazed onto the can of the fuel element in the case in which the can and spacer member are both of stainless steel or else brazed in vacuo in the case of an alloy of the nickel-chrome type. In the case of Zircalloy, a brazing compound of the zirconium-beryllium type containing 5% beryllium can be employed. The brazing operation on each fuel pencil can readily be controlled.

In order to assemble the set of spacer members which has been described in reference to FIGS. 2 and 3, the procedure consists first in mounting the first ring around the central rod or fuel pencil while leaving all the fuel pencils of said first ring free relative to each other. The second step consists in mounting the peripheral ring of fuel pencils and in then welding together the fins of the spacer members of this ring in such manner as to maintain mechanically the diameter of the cluster; these welds are effected at 24 and 25 by electronic beam welding.

This mode of assembly of a fuel element cluster eliminates the problems of vibration between fuel pencils and avoids the need to hold them together by means of an additional collar which would increase pressure drops to a substantial extent.

In a second form of embodiment of a set of spacer members as illustrated in FIGS. 4 and 5, it has been endeavored to simplify the fabrication thereof.

In this case, the spacer member 26 which is placed around the central rod or fuel pencil is provided with three fins such as the fin 27 which are spaced apart at an angle of 120° around its collar; these three fins are identical.

The spacer members 28 of the intermediate ring are symmetrical in pairs, that is to say identical back-to-back, and are each provided with three fins 29, 30 and 31. The fin 29 is applied both against a fin of an adjacent spacer member of the same ring and against a fin of the spacer member of the central rod or fuel pencil, the fin 30 is applied against two fins of two adjacent spacer members of the peripheral ring and finally, the fin 31 is applied against a fin of the other adjacent spacer member of the same ring.

Finally, the spacer members 32 and 33 of the peripheral ring are also symmetrical in pairs, that is to say identical back-to-back and each have two fins 34 and 35. The fin 34 is applied against a fin of an adjacent spacer member of the same ring and the fin 35 is applied both against a fin of the other adjacent spacer member of the same ring and against a fin of a spacer member of the intermediate ring.

As can be seen from these figures, there are in this assembly only three kinds of spacer members 26, 28 and 32; the first is a single spacer member which surrounds the central rod or fuel pencil; the two others can be fabricated in an economical manner by extrusion and drawing of a blank 36 which is illustrated in FIG. 6 and which it is then merely necessary to machine in order to obtain at will either a spacer member 28 or a spacer member 32.

In order to assemble the set of spacer members which is described in reference to FIGS. 4 and 5, the first step consists in mounting the first ring around the central rod or fuel pencil but, contrary to the previous form of embodiment, this first ring is welded at the points such as 37 and 38. However, it is useful to note that there is no need to weld the fins of the spacer member of the central rod or fuel pencil. The peripheral ring of fuel pencils is then mounted and the fins of said ring are welded to each other at the point such as 39 and 40. It will be observed that the different welds such as 37, 38, 39 and 40 are arranged in such a manner as to permit of free expansion of the rings with respect to each other as well as with respect to the central rod or fuel pencil.

As will be readily understood, and as has in any case been made apparent in the foregoing, the present invention is not limited in any sense to the forms of embodiment which have been described and illustrated or to the modes of application which have been more especially contemplated but is intended, on the contrary, to extend to all alternative forms.

What I claim is:

1. An improved brace for supporting and spacing apart a plurality of fuel pencils arranged in at least two rings around a central member and forming a fuel cluster for a nuclear reactor of the type which is cooled by a heat-transporting fluid, said brace comprising: a plurality of annular support members disposed in a common plane and arranged in at least two rings around a central support member, each of the support members forming said rings having spacer members extending radially outwardly therefrom spacing said support members apart relative to each other, at least all of the spacer members carried by and spacing apart the outer ring of support members being welded to each other forming a single-piece outer ring.

2. An improved brace in accordance with claim 1 in which said spacer members carried by each of said support members forming a ring disposed within said outer rings, engage and space apart three adjacent support members.

3. An improved brace in accordance with claim 1 in which said spacer members carried by a predetermined number of said support members space apart at least three adjacent support members.

4. An improved brace in accordance with claim 1 in which the spacer members carried by and spacing apart a ring of said support members disposed within said outer ring, are welded to each other forming a single-piece inner ring.

5. Fuel element assembly in accordance with claim 1 in which said support members are formed of Zircalloy.

6. Fuel element assembly in accordance with claim 1 in which said support members are formed of stainless steel.

7. Fuel element assembly in accordance with claim 1 in which said support members are formed of an alloy of nickel-chrome.

References Cited by the Examiner

UNITED STATES PATENTS

| 2,898,280 | 8/1959 | Schultz | 176—78 |
| 2,902,422 | 9/1959 | Hutter | 176—78 |
| 3,239,426 | 3/1966 | Waine et al. | 176—78 |
| 3,240,681 | 3/1966 | Waine et al. | 176—78 |

FOREIGN PATENTS

| 660,095 | 3/1963 | Canada. |

BENJAMIN R. PADGETT, *Primary Examiner.*

LEON D. ROSDOL, *Examiner.*

M. J. SCOLNICK, *Assistant Examiner.*